(12) United States Patent
Kikuchi

(10) Patent No.: US 12,130,264 B2
(45) Date of Patent: Oct. 29, 2024

(54) HAMMERING TEST SYSTEM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 281 days.

(21) Appl. No.: 17/943,593

(22) Filed: Sep. 13, 2022

(65) Prior Publication Data

US 2023/0093886 A1    Mar. 30, 2023

(30) Foreign Application Priority Data

Sep. 30, 2021  (JP) .................................. 2021-160657

(51) Int. Cl.
*G01N 3/303*        (2006.01)
(52) U.S. Cl.
CPC .................................. *G01N 3/303* (2013.01)
(58) Field of Classification Search
CPC ........... G01N 3/303; G01N 2291/0232; G01N 2291/0289; G01N 29/048; G01N 29/265; G01N 29/045; G01M 5/0033; G01M 5/0066; G01M 5/0075; G01M 7/08; Y02E 30/30
See application file for complete search history.

(56) References Cited

U.S. PATENT DOCUMENTS

| 2005/0097961 A1* | 5/2005 | Yagi ..................... G01N 29/045 73/573 |
| 2009/0301203 A1 | 12/2009 | Brussieux |
| 2018/0032088 A1 | 2/2018 | van Cruyningen |
| 2019/0212304 A1 | 7/2019 | Yamashita et al. |

(Continued)

FOREIGN PATENT DOCUMENTS

| JP | 2001249117 | 9/2001 |
| JP | 2004-205216 A | 7/2004 |
| JP | 2011194937 | 10/2011 |

(Continued)

OTHER PUBLICATIONS

Related U.S. Appl. No. 17/943,611, filed Sep. 13, 2022.

*Primary Examiner* — David J Bolduc
(74) *Attorney, Agent, or Firm* — Studebaker & Brackett PC

(57) ABSTRACT

Provided is a hammering test system. A hammering test system includes a hammering test device including a target, a traveling mechanism for automatically traveling on a to-be-tested surface, a marking mechanism configured to perform marking on the to-be-tested surface, an adsorbing mechanism for adsorbing to the to-be-tested surface, and a hammering test mechanism configured to conduct a hammering test on the to-be-tested surface, and a surveying instrument capable of performing automatic tracking and distance and angle measurements of the target. A hammering test is conducted by causing the hammering test device to travel to a desired position while adsorbing to a to-be-tested (Continued)

surface by the adsorbing mechanism. When it is determined that there is an abnormality, a marking is marked on the to-be-tested surface. The surveying instrument automatically tracks the target, and when conducting a hammering test, makes distance and angle measurements of the target.

4 Claims, 12 Drawing Sheets

(56) References Cited

U.S. PATENT DOCUMENTS

2020/0378927 A1 12/2020 Nishizawa et al.
2021/0064024 A1 3/2021 Hammond et al.

FOREIGN PATENT DOCUMENTS

| JP | 2018128278 | 8/2018 |
| JP | 2020-079526 A | 5/2020 |
| KR | 20200143161 | 12/2020 |

\* cited by examiner

HAMMERING TEST SYSTEM

TECHNICAL FIELD

The present invention relates to a hammering test system capable of stably conducting a hammering test over a wide range.

BACKGROUND ART

A periodic test is conducted on a building to maintain safety. For example, in a concrete building, whether there is an abnormal portion such as cracking and floating inside the concrete is confirmed by conducting a hammering test in which an inspector inspects hammering sounds by hammering the concrete building with a hammer. A test object is a large-sized structure such as a building, a bridge pier, or a tunnel, where the hand of an inspector cannot reach a to-be-tested surface in some cases. Therefore, a test is conducted by attaching a testing device to a tip end of an arm and extending the arm (Patent Literature 1), or a test is conducted by using an air vehicle such as a multicopter (Patent Literature 2).

CITATION LIST

Patent Literature

Patent Literature 1: Japanese Published Unexamined Patent Application No. 2004-205216
Patent Literature 2: Japanese Published Unexamined Patent Application No. 2020-79526

SUMMARY OF INVENTION

Technical Problem

However, the length of an arm is limited, and a test is conducted only in a range up to a maximum length of the arm. A hammering test using an air vehicle has a problem in which it lacks stability of hammering with a hammer.

The present invention was made in view of these problems, and provides a hammering test system capable of stably conducting a hammering test even in high places that are out of an inspector's reach.

Solution to Problem

In order to solve the problems described above, according to an aspect of the present disclosure, a hammering test system is configured which includes a hammering test device including a target, a traveling mechanism for automatically traveling on a to-be-tested surface, a marking mechanism configured to perform marking on the to-be-tested surface, an adsorbing mechanism for adsorbing to the to-be-tested surface, and a hammering test mechanism configured to conduct a hammering test on the to-be-tested surface, a device control unit configured to control the traveling mechanism, the marking mechanism, and the hammering test mechanism, a surveying instrument including a tracking unit configured to automatically track the target, a distance-measuring unit configured to measure a distance to the target, and an angle-measuring unit configured to measure angles of the target, a surveying instrument control unit configured to control the surveying instrument, and a determining unit configured to determine whether there is an abnormality on the to-be-tested surface by a hammering test conducted by the hammering test device, wherein the device control unit causes the hammering test device to travel to a desired position while adsorbing to the to-be-tested surface by the adsorbing mechanism, causes the hammering test device to conduct a hammering test, and controls the marking mechanism to perform marking when the determining unit determines that there is an abnormality, and the surveying instrument control unit causes the surveying instrument to automatically track the target, and controls the surveying instrument to make distance and angle measurements of the target when conducting a hammering test by the hammering test device.

According to this aspect, the hammering test device adsorbs to a to-be-tested surface even when the to-be-tested surface is a ceiling surface or a vertical surface. The hammering test device autonomously travels while being stuck on the to-be-tested surface and can conduct a hammering test even in high places. In addition, by hammering by the hammering test device, a hammering test is stably conducted at a location such as high places without depending on a skill level of a worker. The hammering test device can travel while its position is grasped by the target and the surveying instrument. A hammering test position is also accurately grasped by the target and the surveying instrument.

According to an aspect, the device control unit is configured to cause the hammering test device to travel over the entire to-be-tested surface by causing the hammering test device to travel in a predetermined pattern, and cause the hammering test mechanism to conduct a hammering test at intervals of a predetermined time or a predetermined distance during traveling. According to this aspect, due to traveling in a predetermined pattern on the to-be-tested surface, the to-be-tested surface can be thoroughly subjected to the test, and by conducting a hammering test in each predetermined range or at intervals of a predetermined distance, the hammering test can be automatically conducted on the to-be-tested surface without omission.

According to an aspect, based on data acquired by distance and angle measurements by the surveying instrument, by calculating three-dimensional shape data of the to-be-tested surface and linking the three-dimensional shape data to a determination result obtained by the determining unit, processing to convert a test result into visually recognizable information is performed. According to this aspect, three-dimensional data of the to-be-tested surface is acquired, and an abnormal portion can be visually recognized based on the test result. An abnormal portion can be grasped at a glance together with a marking on an actual to-be-tested surface or with a to-be-tested surface shape by data.

Advantageous Effects of Invention

As is clear from the above description, according to the present invention, a hammering test system capable of stably conducting a hammering test even in high places is provided.

DESCRIPTION OF EMBODIMENTS

Hereinafter, detailed embodiments of configurations of the present disclosure will be described with reference to the drawings. Embodiments are not intended to limit the invention but are examples, and all features and combinations thereof described in the embodiments are not always essential to the invention. Components having the same configurations are provided with the same reference signs, and overlapping description thereof will be omitted.

Hammering Test System

Figure 1:
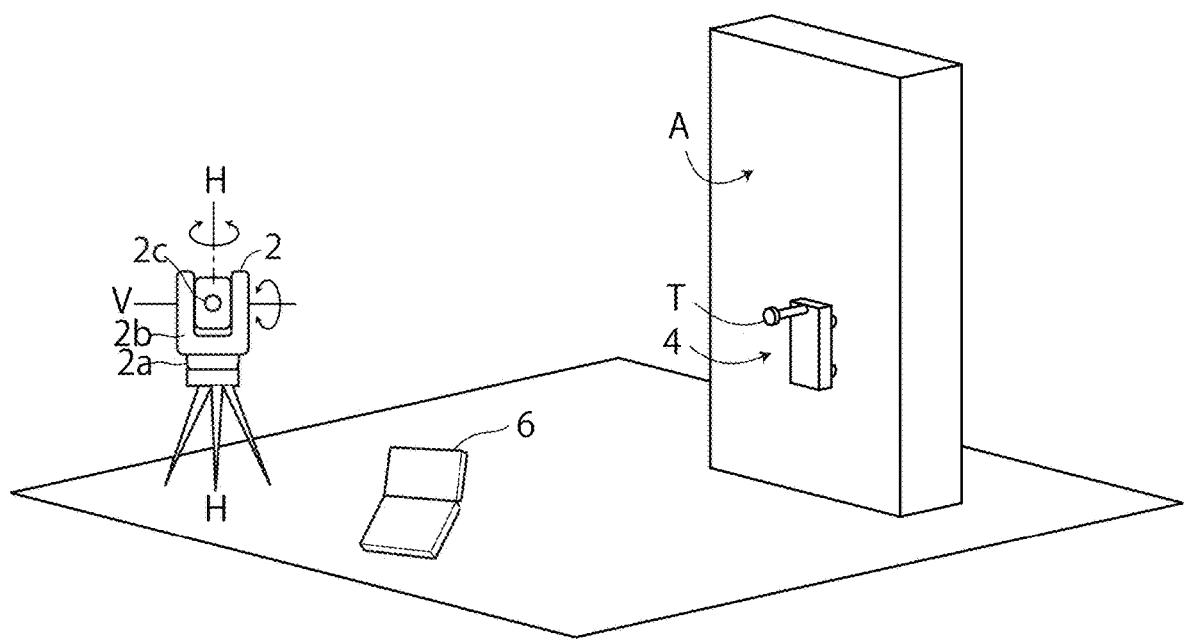
FIG. 1 is a schematic configuration view of a hammering test system according to a preferred embodiment.

FIG. 1 is a schematic configuration view of a hammering test system 1 according to a preferred embodiment of the present invention, and illustrates a work image at a test site. The hammering test system 1 according to the present embodiment includes a hammering test device 4, a surveying instrument 2, and a processing PC (Personal Computer) 6. The processing PC 6, the surveying instrument 2, and the hammering test device 4 are connected to each other, and can transmit and receive information to and from each other.

The hammering test device 4 is configured to be capable of traveling on a to-be-tested surface A by traveling in response to an operation or by autonomous traveling, and has an adsorbing means that causes the device itself to adsorb to the to-be-tested surface A, and even when the to-be-tested surface A is a vertical surface or a ceiling surface, the hammering test device 4 travels while being stuck on the to-be-tested surface A so as not to separate from the to-be-tested surface A. The hammering test device 4 autonomously moves to a test position on the to-be-tested surface A and conducts a hammering test.

A target T is attached to the hammering test device 4. The target T is a so-called 360-degree prism configured by radially combining a plurality of triangular-pyramid-shaped prisms, and retro-reflects light incident from the entire circumference (360°) toward a direction opposite to an incident direction of the light.

The processing PC 6 is installed at a test site. The surveying instrument 2, the hammering test device 4, and the processing PC 6 are wirelessly connected to each other (may be connected by wire), and can transmit and receive information to and from each other.

The surveying instrument 2 is installed on a reference point center by using a tripod. The surveying instrument 2 includes a base portion 2a provided on a leveling device, a bracket portion 2b that rotates horizontally around an axis H-H on the base portion 2a, and a telescope 2c that rotates vertically around an axis V-V at a center of the bracket portion 2b. The surveying instrument 2 has an automatic tracking function, a distance-measuring function, and an angle-measuring function, and tracks the target T of the traveling hammering test device 4, and makes distance and angle measurements of the target T at the time of a hammering test.

Surveying Instrument 2

Figure 2:
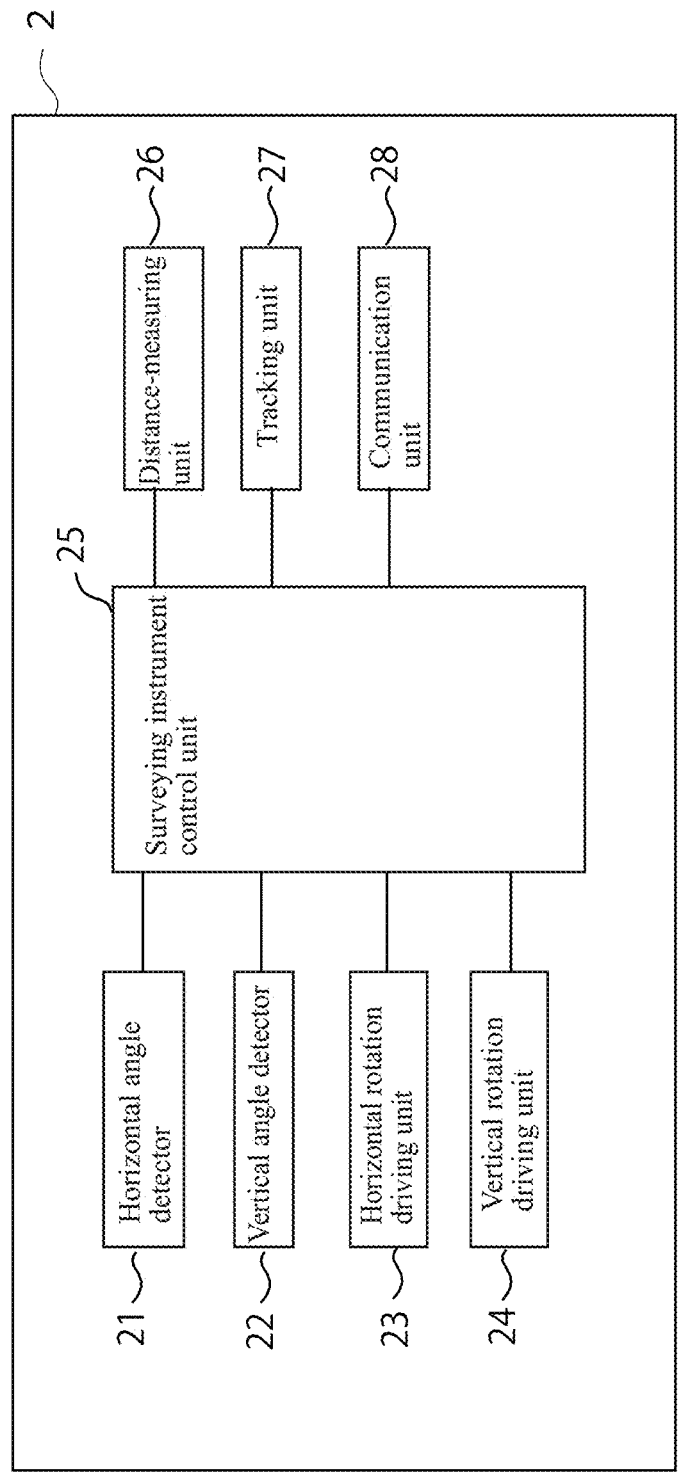
FIG. 2 is a configuration block diagram of a surveying instrument.

FIG. 2 is a configuration block diagram of the surveying instrument 2. The surveying instrument 2 is a motor-driven total station, and includes a horizontal angle detector 21, a vertical angle detector 22, a horizontal rotation driving unit 23, a vertical rotation driving unit 24, a surveying instrument control unit 25, a distance-measuring unit 26, a tracking unit 27, and a communication unit 28.

The horizontal angle detector 21 and the vertical angle detector 22 are encoders. The horizontal angle detector 21 is provided on a rotation shaft of the bracket portion 2b, and detects a horizontal angle of the bracket portion 2b. The vertical angle detector 22 is provided on a rotation shaft of the telescope 2c, and detects a vertical angle of the telescope 2c.

The horizontal rotation driving unit 23 and the vertical rotation driving unit 24 are motors. The horizontal rotation driving unit 23 drives the rotation shaft of the bracket portion 2b, and the vertical rotation driving unit 24 drives the rotation shaft of the telescope 2c. By collaboration of both driving units, the orientation of the telescope 2c is changed. The horizontal angle detector 21 and the vertical angle detector 22 constitute an angle-measuring unit. The horizontal rotation driving unit 23 and the vertical rotation driving unit 24 constitute a driving unit.

The distance-measuring unit 26 includes a light transmitting unit and a light receiving unit, and outputs distance-measuring light, for example, an infrared pulsed laser, etc., from the light transmitting unit, receives reflected light of the distance-measuring light by the light receiving unit, and measures a distance from a phase difference between the distance-measuring light and internal reference light. The distance-measuring unit can make not only a prism measurement but also a non-prism measurement.

The tracking unit 27 includes a tracking light transmitting system that outputs, as tracking light, an infrared laser, etc., of a wavelength different from that of the distance-measuring light, and a tracking light receiving system including an image sensor such as a CCD sensor or CMOS sensor. The tracking unit 27 acquires a landscape image including the tracking light and a landscape image excluding the tracking light, and transmits both images to the surveying instrument control unit 25. The surveying instrument control unit 25 obtains a center of a target image from a difference between the images, detects a position where a deviation between a center of the target image and a visual axis center of the telescope 2c falls within a certain value as a position of the target, and performs automatic tracking to cause the telescope 2c to always face the target.

The communication unit 28 enables communication with an external network, and for example, connects to the Internet by using an Internet Protocol (TCP/IP) and transmits and receives information to and from the hammering test device 4 and the processing PC 6. The wireless communication is not limited to this, and known wireless communication can be used.

The surveying instrument control unit 25 is a microcontroller including a CPU, and includes a ROM and a RAM, and according to programs stored in the ROM, respective controls are executed in the RAM. As the controls, information transmission and reception through the communication unit 28, driving of the respective rotation shafts by the horizontal rotation driving unit 23 and the vertical rotation driving unit 24, a distance measurement by the distance-measuring unit 26, angle measurements by the horizontal angle detector 21 and the vertical angle detector 22, and automatic tracking by the tracking unit 27, are performed.

The surveying instrument 2 makes distance and angle measurements of the target T by the distance-measuring unit 26 and the angle-measuring units (21, 22). The surveying instrument 2 makes distance and angle measurements of the target T at a timing synchronized with a timing of conducting a hammering test, and measurement (distance and angle measurements) results (hereinafter, referred to as measurement data DA) are transmitted to the processing PC 6 through the communication unit 28. Even during tracking, the surveying instrument 2 makes distance and angle measurements of the target T at predetermined intervals as needed. Measurement data acquired during tracking is also transmitted to the processing PC 6, and a traveling route and a traveling time of the target T are grasped.

Processing PC 6

Figure 3:
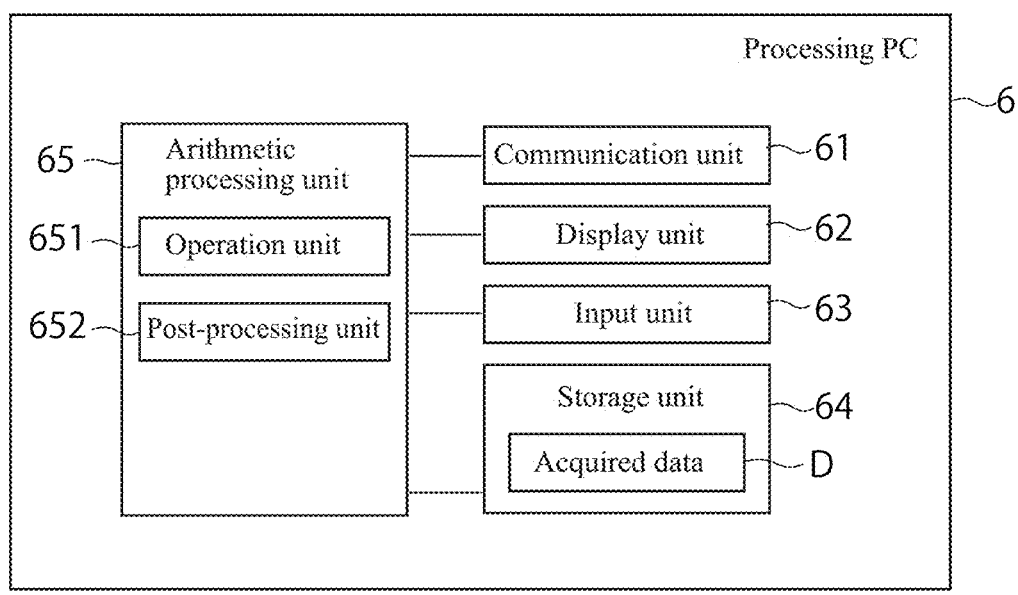
FIG. 3 is a configuration block diagram of a processing PC.

FIG. 3 is a configuration block diagram of the processing PC 6. The processing PC 6 is a general-purpose personal computer, dedicated hardware using a PLD (programmable Logic Device), a tablet terminal, a smartphone, etc. The processing PC 6 includes a communication unit 61, a display unit 62, an input unit 63, a storage unit 64, and an arithmetic processing unit 65.

The communication unit 61 has a structure equivalent to the structure of the above-described communication unit 28, and transmits and receives information to and from the surveying instrument 2 and the hammering test device 4.

The display unit 62 is, for example, a liquid crystal display. The input unit 63 is a keyboard, a mouse, etc., and enables various inputs, selections, and determinations.

The storage unit 64 is, for example, an HDD drive. In the storage unit 64, data acquired through a hammering test is stored.

The arithmetic processing unit 65 is a control unit configured by mounting at least a CPU and a memory (RAM, ROM, etc.) on an integrated circuit.

The hammering test device 4 is capable of autonomously traveling, and performs predetermined traveling (autonomous traveling) according to a built-in program, and can also be remotely operated by the processing PC 6, and in the arithmetic processing unit 65, as a controller of the hammering test device, an operation unit 651 is configured software-wise. In collaboration with the input unit 63, a worker can directly operate the hammering test device 4 (manual traveling). The operation unit 651 can also grasp position information by automatic tracking of the surveying instrument 2, and cause the hammering test device to travel on a desired route while performing feed-back control. In this case, an operation by the worker is not necessary, and the hammering test device 4 automatically travels according to complete control of the operation unit 651.

In the arithmetic processing unit 65, a post-processing unit 652 that performs post-processing of data acquired through a hammering test is also configured software-wise. The post-processing will be described later.

Hammering Test Device 4

Figure 4A:
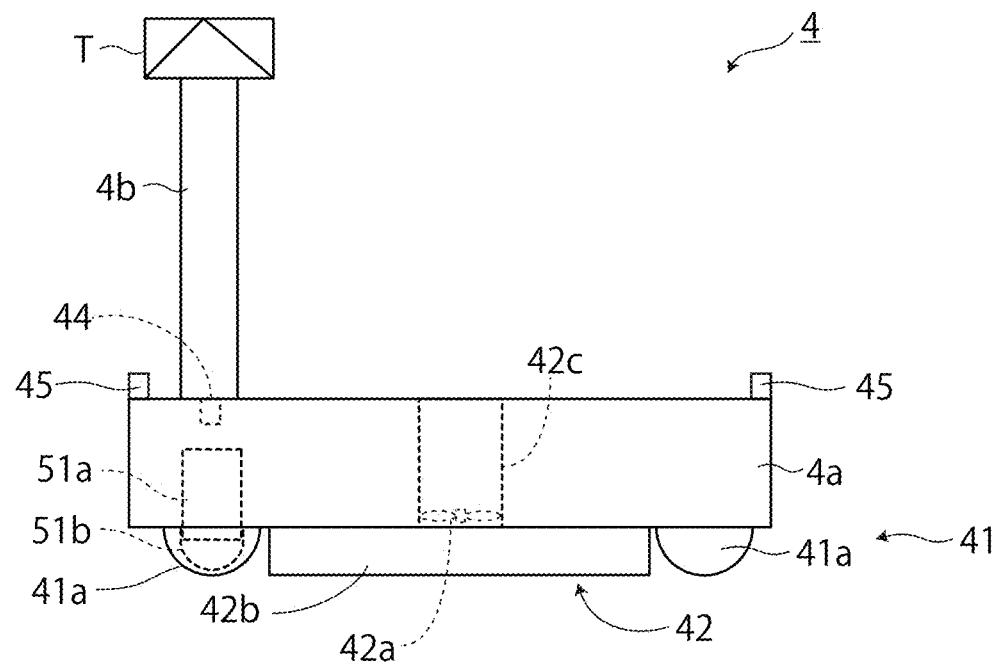
FIG. 4A is a side view of a hammering test device.
Figure 4B:
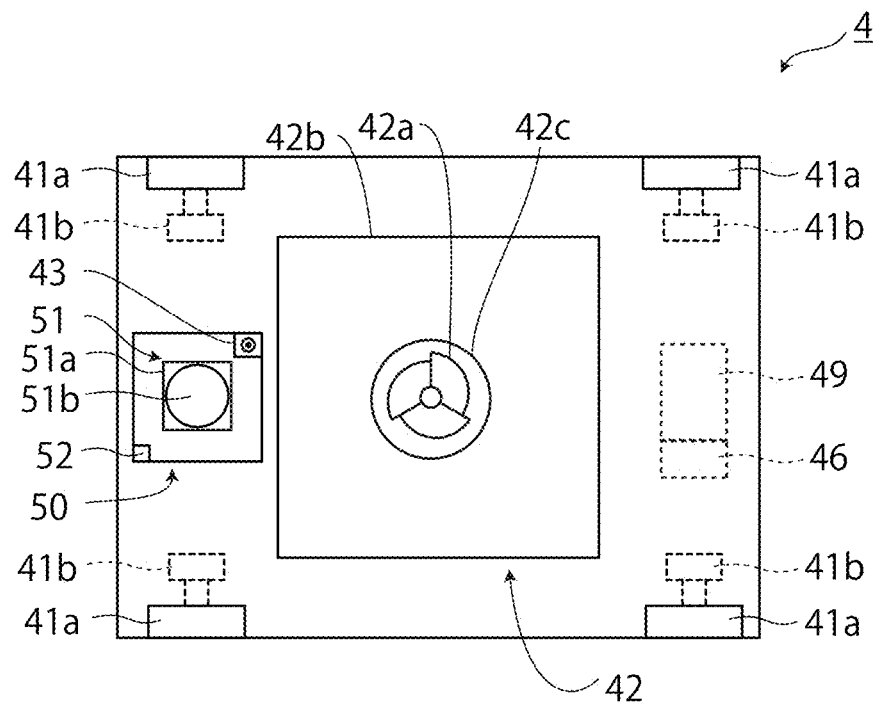
FIG. 4B is a bottom view of the hammering test device.
Figure 5:
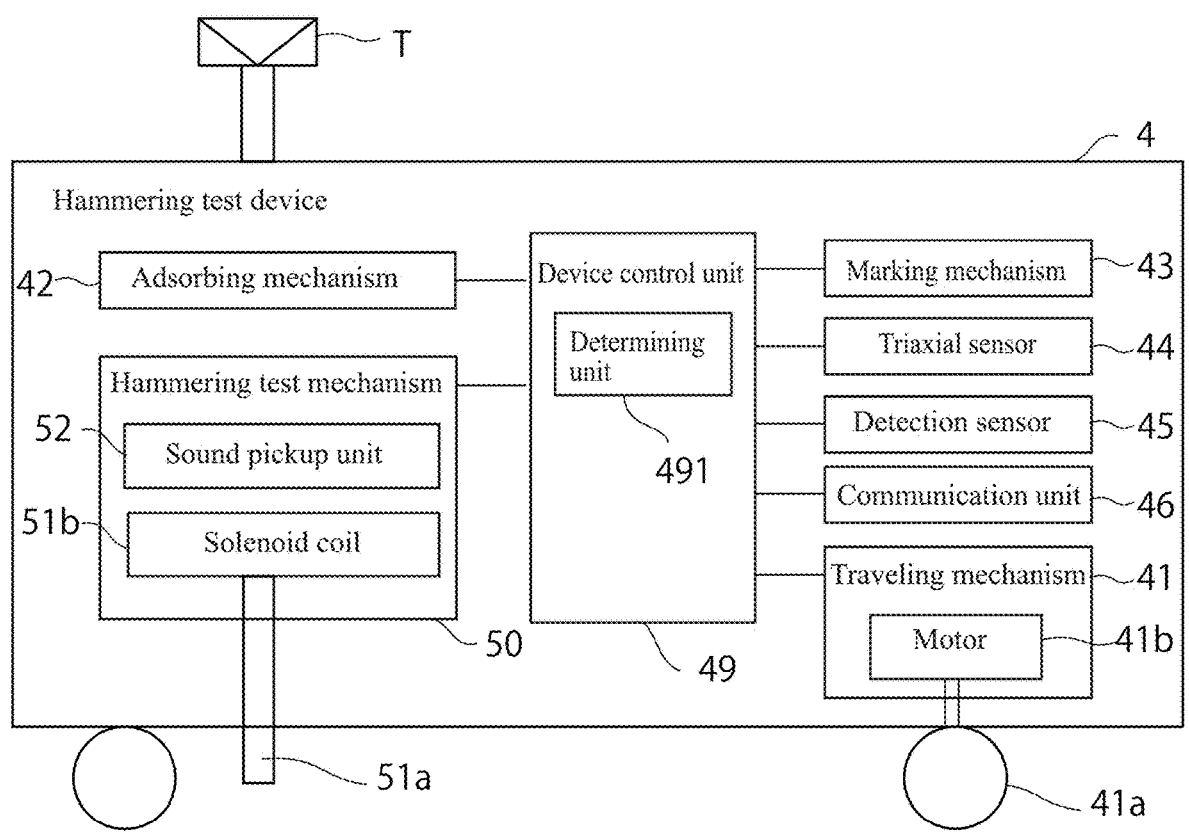
FIG. 5 is a configuration block diagram of the hammering test device.

FIGS. 4A and 4B illustrate a hammering test device 4, and FIG. 4A is a side view, and FIG. 4B is a bottom view. FIG. 5 is a configuration block diagram of the hammering test device 4.

The hammering test device 4 includes a target T, a hammering test mechanism 50, a traveling mechanism 41, an adsorbing mechanism 42, a marking mechanism 43, a triaxial sensor 44, detection sensors 45, a communication unit 46, and a device control unit 49.

The hammering test device 4 has a housing 4a having a rectangular parallelepiped shape, and on an upper surface of the housing 4a, a pole 4b as a target support member is erected, and at an upper end portion of the pole 4b, the target T is disposed.

The hammering test mechanism 50 includes a hammering unit 51 and a sound pickup unit 52.

The hammering unit 51 includes a solenoid coil 51a and a columnar hammer 51b, and hammers the to-be-tested surface A by moving the hammer 51b up and down according to ON/OFF of current application to the solenoid coil. In the present embodiment, a hammering point of the hammer 51b is defined as a test point P. Specifically, an intersection between a vertical line of a center of the hammer 51b and a virtual to-be-tested surface when the hammering test device 4 is disposed on the virtual to-be-tested surface that is a horizontal surface, is defined as a hammering point of the hammer 51b. The target T is disposed vertically above the hammer 51b. Relative positions of an optical center point of the target T and the hammering point of the hammer 51b are known.

The sound pickup unit 52 is a so-called microphone, and is disposed near the hammer 51b and picks-up hammering sounds produced by the hammer 51b. Picked-up sound pickup data DC is output to the device control unit 49.

The traveling mechanism 41 is a mechanism for moving to a predetermined position by causing the hammering test device 4 to freely travel, and is provided at four corners of a bottom surface portion of the housing 4a. The traveling mechanism 41 includes four wheels 41a and four motors 41b serving as drive sources joined to the respective wheels 41a. The wheels 41a are provided at four corners of the bottom surface of the housing 4a, and joined motors 41b drive and rotate the wheels 41a joined independently of each other. The motors 41b can freely rotate forward/reversely, and by driving the plurality of motors 41b independently, a forward traveling operation, a backward traveling operation, and a turning operation can be performed. The number of wheels 41a may be set to three or more, and for example, another mechanism in which a ball-shaped wheel is disposed vertically below the pole 4b instead of the pair of front wheels, may also be arranged. That is, the pair of rear wheels are driven by motors, and the hammering test device 4 is supported by the three wheels and operated to freely travel. In this case, the hammering test mechanism 50 is disposed on a rear side of the housing 4a. It is also possible that a plurality of wheels 41a are driven to rotate by one traveling actuator through a chain link mechanism. In addition, a configuration including a caterpillar track (a traveling means configured by laying a crawler across a plurality of wheels) may be arranged.

The adsorbing mechanism 42 includes a suction fan 42a, a skirt 42b, and a duct 42c. A bottom surface center of the housing 4a is opened and the duct 42c is provided, and at a center of the duct, the suction fan 42a is provided. The duct 42c covers the suction fan 42a, and penetrates through the housing 4a and an exhaust port is formed in an upper surface of the housing 4a. The skirt 42b is centered at the suction fan 42a and widely encloses the suction fan, and extends toward a lower side (to-be-tested surface A side) of the hammering test device 4 from the bottom surface of the housing 4a while avoiding the traveling mechanism 41 and the hammering test mechanism 50. The skirt 42b is made of an elastic member such as rubber having a predetermined frictional coefficient, and adsorbs to the to-be-tested surface A.

When the suction fan 42a is driven, air in a space defined by the bottom surface of the housing 4a, the skirt 42b, and the to-be-tested surface A is exhausted to the outside through the duct 42c. Therefore, the space is maintained at a predetermined negative pressure. Accordingly, the hammering test device 4 adsorbs to the to-be-tested surface A, and can travel without coming off the to-be-tested surface A.

The marking mechanism 43 is a discharge device that jets out a colored solution for marking from a nozzle at a tip end to make a marking at a target point. The marking mechanism 43 is fixed to a lower portion of the housing 4a so that a tip end of the nozzle is directed vertically downward. When it is suspected that there is an abnormality as a result of a hammering test, the solution is jetted out to visualize an abnormal portion. When a fluorescent paint is contained in the solution, a worker can easily grasp a position even in a dark place such as a tunnel and at night.

The triaxial sensor 44 is an IMU (inertial measuring unit), and includes a triaxial gyro and a triaxial accelerometer, and acquires angular velocities and accelerations of the hammering test device 4 in three-axis directions. The triaxial sensor 44 functions as a posture detecting device that detects a posture of the hammering test device 4. Hereinafter, a detection result of the triaxial sensor 44 is referred to as posture data DB. The triaxial sensor 44 acquires posture data DB at a timing synchronized with a timing of conducting a hammering test, and the acquired posture data DB is transmitted to the processing PC 6. The hammering test device 4 can travel on the to-be-tested surface A even when the to-be-tested surface A is a ceiling surface. Therefore, in order to grasp a detailed position of the test point P of the hammering test, it is preferable to acquire posture data DB at the time of the hammering test. Together with the measurement data DA that is distance and angle measurement data of the target T, the posture data DB transmitted to the processing PC 6 is used for calculation of detailed three-dimensional coordinates of the test point P where the hammering test was conducted.

The detection sensors 45 are optical sensors that detect an obstacle, and are disposed in four directions on the housing 4a and detect an obstacle in a traveling direction of the hammering test device 4. When an obstacle is detected, a traveling route of the hammering test device 4 is changed. A configuration may be arranged in which an imaging device such as a CCD or CMOS sensor is used to identify the presence of an obstacle and its position by analyzing imaged images. It is more preferable that an edge portion and a hole of the to-be-tested surface A are also detected as a kind of obstacle. In this way, the hammering test device 4 is prevented from coming off the to-be-tested surface A.

The communication unit 46 has a structure equivalent to the structure of the above-described communication unit 28, and transmits and receives information to and from the surveying instrument 2 and the processing PC 6.

The device control unit 49 is a microcontroller including a CPU, and includes a ROM and a RAM, and according to programs stored in the ROM, respective controls are executed in the RAM. The device control unit 49 performs controls of various mechanisms installed in the hammering test device 4, including controls of a timing of a hammering test by the hammering test mechanism 50, traveling of the traveling mechanism 41, ON/OFF of the suction fan 42a of the adsorbing mechanism 42, a jetting instruction to the marking mechanism 43, and data acquisition of the triaxial sensor 44 and the detection sensors 45, etc.

In the device control unit 49, a determining unit 491 that determines whether there is an abnormality by analyzing sound pickup data DC output from the hammering test mechanism 50 is installed. Here, an abnormality includes cracking, peeling, floating, and internal cavities, etc., of the to-be-tested surface. When an abnormality is found, the device control unit 49 causes the marking mechanism 43 to jet out the solution.

Hammering Test Method

Figure 6:
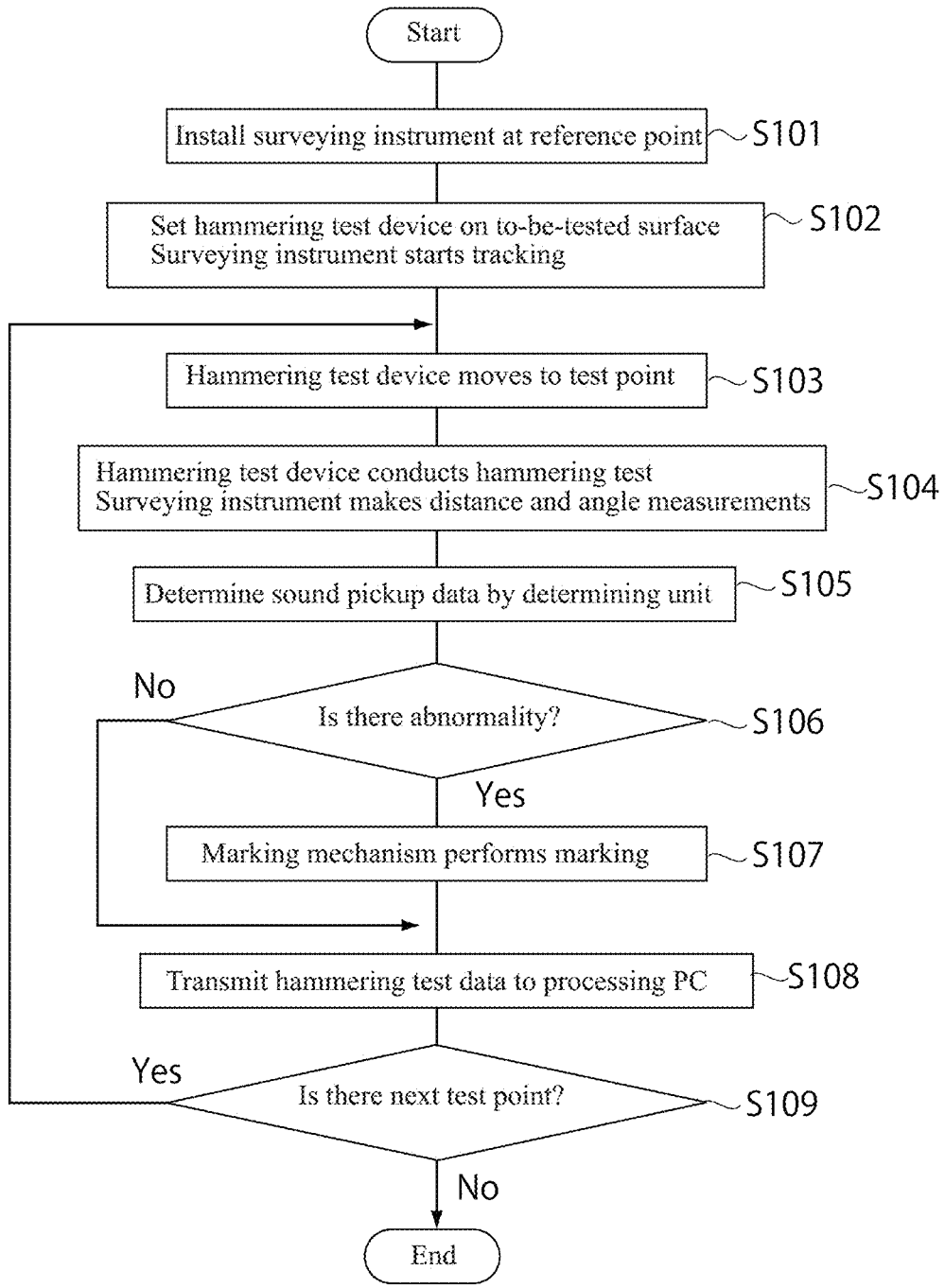
FIG. 6 is a flowchart of a hammering test.

Next, a hammering test method using the hammering test system 1 will be described. FIG. 6 illustrates a work process flow using the hammering test system 1. In the hammering test system 1, a plurality of test points P (P1, P2, P3 . . . ) on the to-be-tested surface A can be successively subjected to a hammering test.

First, in Step S101, the surveying instrument 2 is installed at a reference point.

Next, the processing shifts to Step S102, and the hammering test device 4 is disposed at an initial position on the to-be-tested surface A. The surveying instrument 2 locks on to the target T of the hammering test device 4 and starts tracking.

Next, the processing shifts to Step S103, and the hammering test device 4 is stuck on the to-be-tested surface A by the adsorbing mechanism 42, and moves to a test point Pn by the traveling mechanism 41.

Next, when the hammering test device 4 arrives at the test point Pn, the processing shifts to Step S104, and a hammering test is conducted. The device control unit 49 applies electric current to the solenoid coil 51a of the hammering test mechanism 50, and hammers the to-be-tested surface A by moving the hammer 51b up and down. A hammering sound is picked up by the sound pickup unit 52, and acquired sound pickup data DC is output to the device control unit 49. The hammering test device 4 acquires posture data DB by the triaxial sensor 44. In addition, in synchronization with a timing of the hammering test of the hammering test device 4, distance and angle measurements of the target T are made by the surveying instrument 2. Acquired measurement data DA is transmitted to the processing PC 6 through the communication unit 28.

Next, the processing shifts to Step S105, and the determining unit 491 determines whether there is an abnormality near the test point Pn on the to-be-tested surface A from an analysis of the sound pickup data DC.

Next, the processing shifts to Step S106, and when the determining unit 491 determines that there is an abnormality, the processing shifts to Step S107, and the marking mechanism 43 jets out the solution toward the to-be-tested surface A and performs marking. When jetting is completed, the processing shifts to Step S108. When the determining unit 491 determines that there is no abnormality in Step S106, the processing shifts to Step S108.

Next, the processing shifts to Step S108, and as hammering test data, the posture data DB and the sound pickup data DC are transmitted to the processing PC 6. In the processing PC 6, the measurement data DA, the posture data DB, and the sound pickup data DC are linked to each other as hammering test results at the test point Pn and stored in the storage unit 64. The hammering test at the test point P is completed.

Next, the processing shifts to Step S109, and when there is a test point Pn to be subjected to a next hammering test, the processing shifts to Step S103, and until hammering tests at all test points P are completed, Steps S103 to S109 are repeated. When hammering tests at all test points P are completed, the processing is completed.

As described above, according to the hammering test system 1, the hammering test device 4 can autonomously travel while being stuck on the to-be-tested surface A. Therefore, even when the to-be-tested surface A is a vertical surface or a ceiling surface, the hammering test device 4 can travel without any problem and conduct a hammering test at a desired position. Even in high places that are out of an inspector's reach, a hammering test can be conducted without any problem. In the case of high places, securing a foothold and safety of an inspector become a problem, however, a hammering test can be safely conducted without the need for securing a foothold.

In a hammering test, a determination is made based on a hammering sound produced by hammering with a hammer, and the hammering test depends on the experience and sense of an inspector, however, hammering can be repeatedly mechanically performed with the same force, and an abnormality can be detected from an analysis made by the determining unit without depending on experience. Therefore, quantitative tests without variation can be conducted. A marking is marked at a portion determined to be abnormal, and the abnormal portion can be grasped at a glance.

By repetition of autonomous traveling of the hammering test device 4 and a hammering test, the to-be-tested surface A is automatically tested thoroughly. A test position is grasped by a measurement made by the surveying instrument 2. Therefore, omission of the test is prevented, and a region suspected of being abnormal can be tested intensively.

Traveling Type

The hammering test device 4 can perform "manual traveling" in response to a manual operation performed by an inspector, "autonomous traveling" so as to automatically travel according to a traveling pattern determined in advance, and when shape data of a to-be-tested surface A is prepared in advance, "automatic traveling" in which a traveling route and test points P are designated, and the hammering test device is guided to travel on the designated route while a position of the device is grasped by the surveying instrument 2. Here, a hammering test using autonomous traveling in the present embodiment will be described.

In the hammering test device 4, as autonomous driving, a traveling pattern for thoroughly traveling the to-be-tested surface is stored, and by repeatedly conducting a hammering test while the hammering test device 4 is caused to travel based on the traveling pattern, the to-be-tested surface A can be tested thoroughly.

Figure 7:
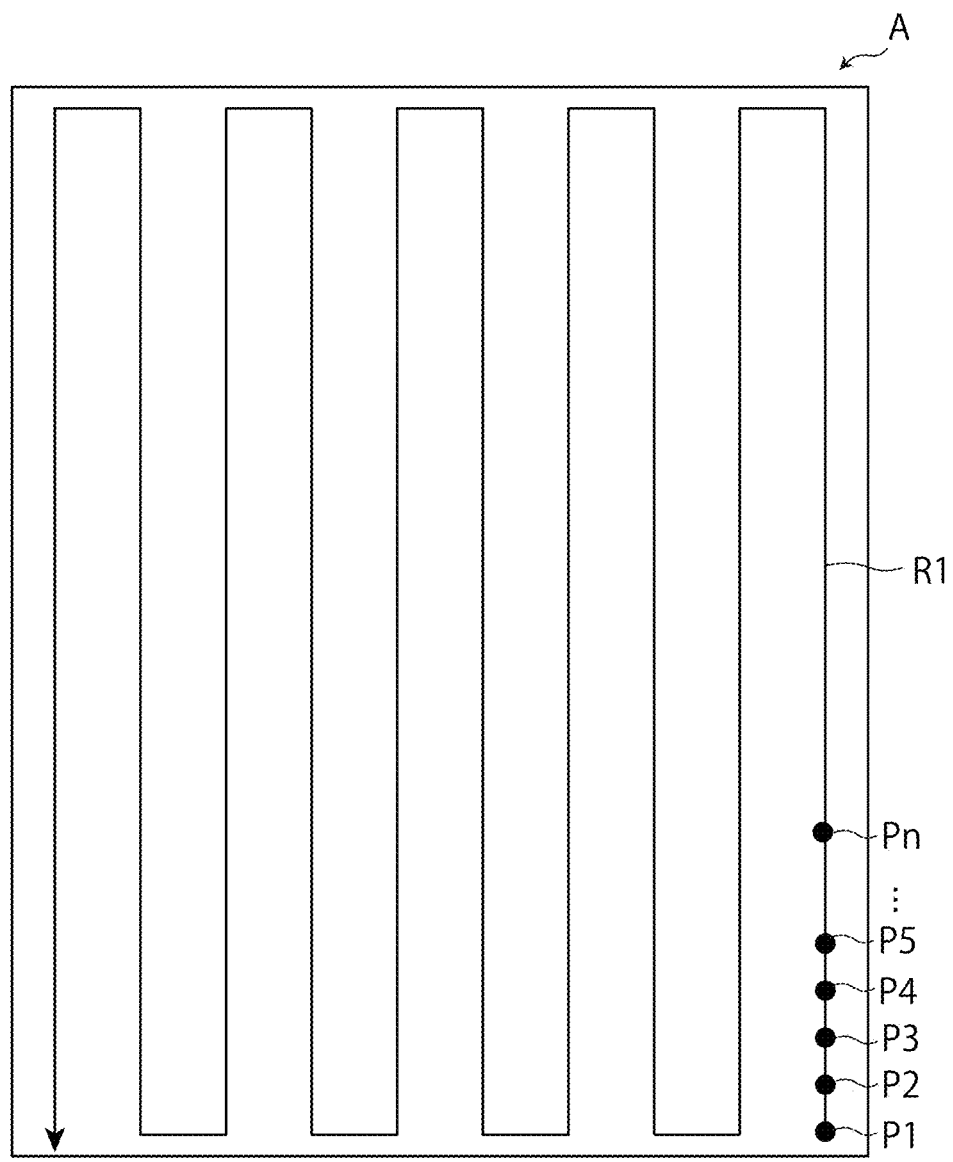
FIG. 7 illustrates an example of a traveling route of the hammering test device.

FIG. 7 illustrates an example of a traveling route in autonomous traveling of the hammering test device 4. The example is illustrated as an example of a traveling pattern. While traveling on a traveling route R1, the hammering test device 4 conducts the test at the test points P (P1, P2, P3 . . . ).

As illustrated in FIG. 7, the hammering test device 4 is disposed at a lower corner portion of the to-be-tested surface A set as an initial position, and from there, the hammering test device 4 is caused to travel upward, and when coming to an upper end portion, the hammering test device 4 is offset-moved a predetermined distance leftward (or rightward), and then caused to travel from the upper end portion to a lower end portion. When coming to a lower end portion, the hammering test device 4 is offset-moved again and caused to travel to the upper end portion. By repeating this, the hammering test device can be caused to travel the entire region of the to-be-tested surface A thoroughly. Alternatively, the hammering test device 4 is disposed at a lower side of an edge portion and moved along the edge portion. When the hammering test device 4 arrives at an end portion, it is turned 90 degrees and caused to travel a predetermined distance in an orthogonal direction from the edge portion. the hammering test device 4 is turned 90 degrees again and offset a predetermined distance from the route that the hammering test device 4 autonomously traveled so as to travel on the same route as traveling at the edge portion. By traveling so as to scan the to-be-tested surface A, even when the end portion is not linear, the to-be-tested surface can be tested thoroughly. When an obstacle is detected by the detection sensor 45, the hammering test device 4 makes a detour along the obstacle. The route that the hammering test device 4 traveled and the device position are grasped by the surveying instrument 2 that makes distance and angle measurements as needed while performing tracking. Traveling routes can cross each other, and there is no problem even when the hammering test device 4 travels in the same place. A hammering test is conducted at intervals of a predetermined distance or a predetermined time. According to conditions of a test object (material such as concrete, the number of years elapsed after construction, and a surface condition, etc.), the frequency of the hammering test can be set. The predetermined distance is preferably set so as to prevent overlapping of test ranges and a region left untested. When an abnormality is detected during a hammering test, to increase the frequency of the hammering test, the predetermined distance and the predetermined time may be shortened. Settings may be made to repeat the test at a construction joint, etc., where an abnormality easily occurs. With the configuration described above, even on a to-be-tested surface A whose shape is unknown, a hammering test is automatically conducted thoroughly in the entire region. Advance preparation including preparation of three-dimensional data of the to-be-tested surface and settings of test points is not required, and a hammering test can be automatically conducted thoroughly even on an old building whose three-dimensional data is not given.

Post-Processing of Hammering Test Data

Next, post-processing of data acquired through a hammering test will be described in detail.

In the storage unit 64, measurement data DA (DA1, DA2, DA3 . . . ), posture data DB (DB1, DB2, DB3 . . . ), and sound pickup data DC (DC1, DC2, DC3 . . . ) at the test points P (P1, P2, P3 . . . ) subjected to a hammering test, are stored.

The post-processing unit 652 calculates three-dimensional coordinates DP of the test points P from three-dimensional coordinates (absolute three-dimensional coordinates) of a reference point at which the surveying instrument 2 is installed, the measurement data DA acquired by the surveying instrument 2, and the posture data DB of the hammering test device 4. Then, based on the calculated three-dimensional coordinates DP (DP1, DP2, DP3 . . . ), three-dimensional shape data of the to-be-tested surface A is calculated.

Further, by analyzing the sound pickup data DC in detail, an abnormality level is calculated and visualized according to the above-described three-dimensional shape data of the to-be-tested surface A. An abnormal portion is colored according to the abnormality level and displayed on the display unit 62 to recognizably indicate a state of the abnormal portion.

Figure 8A:
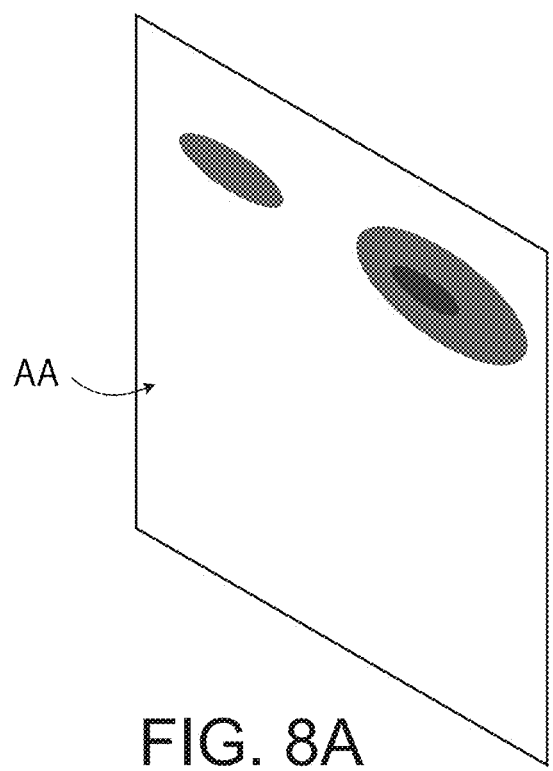
FIG. 8A illustrates an example of display after post-processing of a hammering test.
Figure 8B:
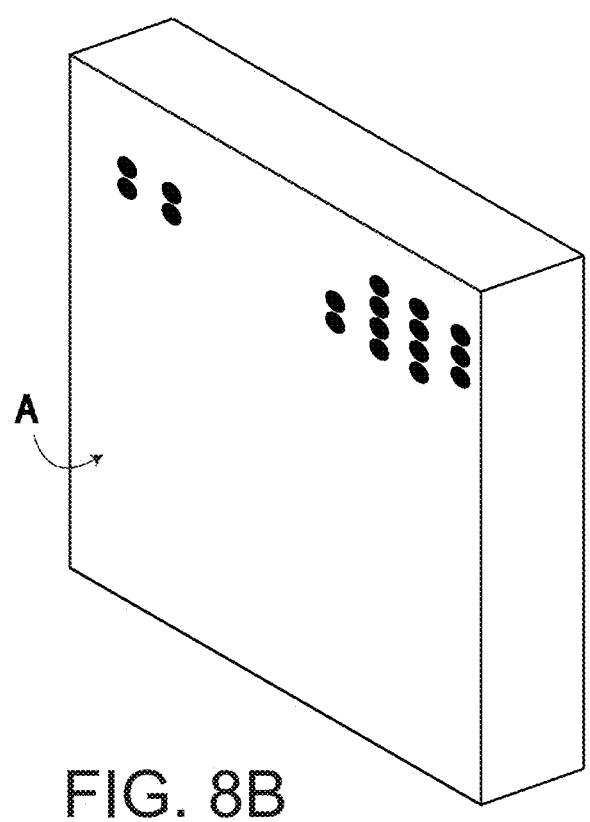
FIG. 8B illustrates a test object after hammering tests.

FIG. 8A illustrates an example of three-dimensional shape data that is subjected to the post-processing described above by the post-processing unit 652 and displayed on the display unit 62. FIG. 8B illustrates a test object after hammering tests.

As illustrated in FIG. 8A, on the display unit 62, a to-be-tested surface AA as three-dimensional shape data of the to-be-tested surface A calculated based on data acquired through hammering tests is displayed, and on an upper surface of the to-be-tested surface AA, portions suspected of being abnormal are illustrated as regions according to the abnormality levels. As illustrated in FIG. 8B, on the to-be-tested surface A of the actual test object, markings are marked. A worker can visually grasp the abnormal portions of the to-be-tested surface both from data and the actual object.

Figure 9:
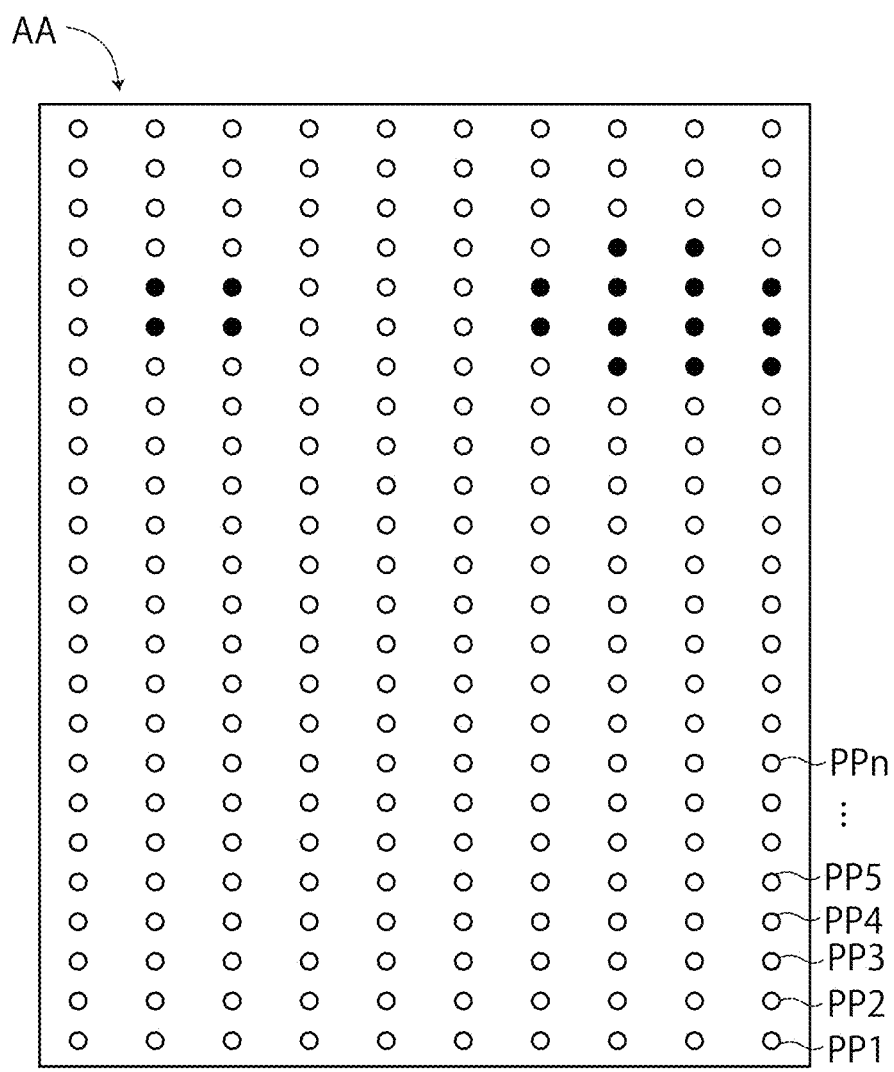
FIG. 9 illustrates an example of a hammering test result.

FIG. 9 illustrates another example of data to be displayed on the display unit 62. On the to-be-tested surface AA, point data PP is displayed. Points PP (PP1, PP2, PP3 . . . ) are disposed at positions corresponding to the test points P (P1, P2, P3 . . . ). Accordingly, post-processing has been performed and the data is displayed as described above, and the to-be-tested surface A and the test points P are visualized.

When a point PP is clicked, the sound pickup data DC can be listened to, and as determination details and analysis results, items are displayed such as an abnormality type (cracking, floating, etc.) and an estimated shape of a predetermined range around the test point, etc. Each point PP is filled with a color that differs depending on whether there is an abnormality or depending on an abnormality level, and an abnormal state is also grasped at a glance.

Figure 10:
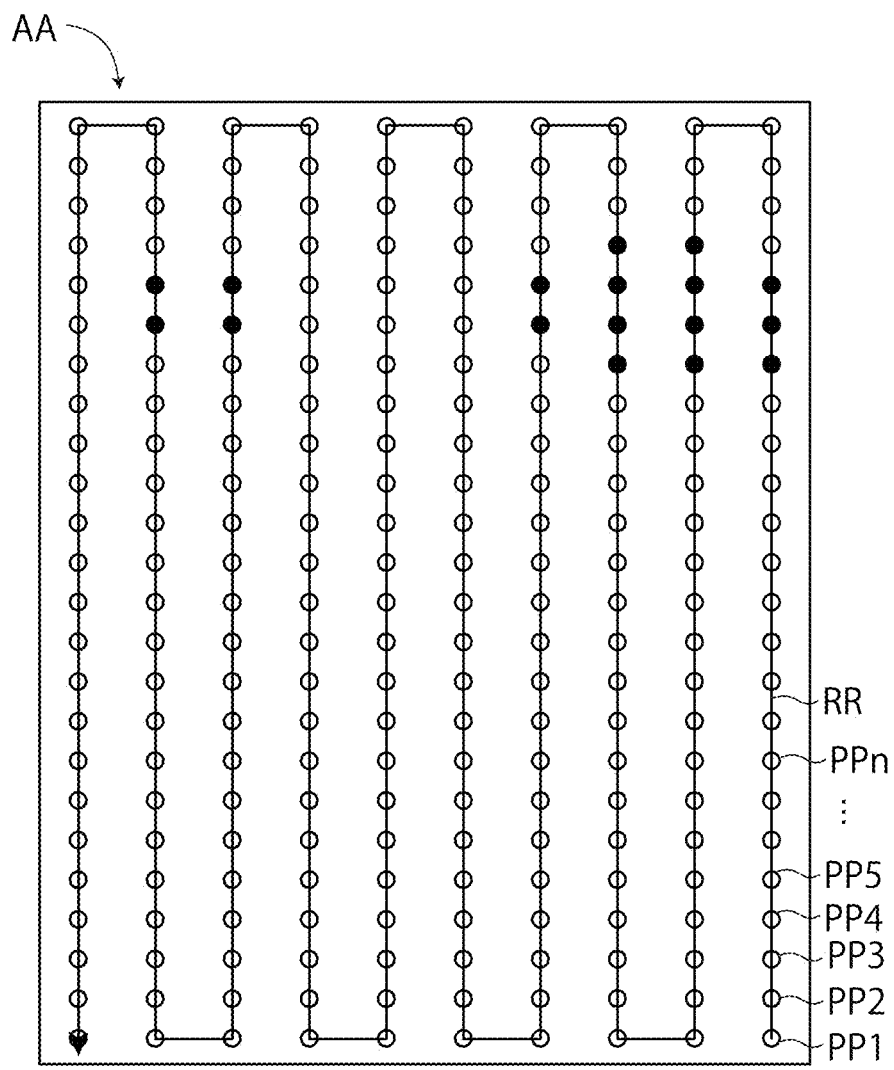
FIG. 10 illustrates an example of a hammering test result.

FIG. 10 illustrates another example of data to be displayed on the display unit 62 after post-processing. The to-be-tested surface A, the traveling route R of the hammering test device 4, and the test points P are displayed on the display unit 62 in the form of data as a to-be-tested surface AA, a traveling route RA, and points PP.

During tracking by the surveying instrument 2, distance and angle measurements are also made at predetermined intervals. Therefore, by outputting acquired data to the storage unit, a traveling route can be grasped. It is more preferable that by acquiring posture data DB from the triaxial sensor 44 in synchronization with a timing of the distance and angle measurements, more accurate three-dimensional data can be acquired.

The respective points and the traveling route are calculated as absolute three-dimensional coordinate data, and based on this, during tracking by the surveying instrument 2, the hammering test device 4 can be guided to automatically travel on the same route to conduct a hammering test at the same test points. Accordingly, a reproduction test of the hammering test can be conducted. The to-be-tested surface A can be easily tested again without the need for setting of test conditions, etc. In many cases, a test object is required to be tested annually for safety, and the number of processes of the annual test can be reduced. As a matter of course, there is a possibility that an abnormal state progresses due to aging or an abnormal state is improved by a repair. Therefore, the reproduction test does not have to be exactly the same as the previous test, and it is only required to thoroughly test the to-be-tested surface A. By conducting a hammering test again thoroughly on the to-be-tested surface A after an elapse of a predetermined period of time, a change due to aging of the to-be-tested surface A can be grasped. Without depending on the skill level of an inspector, despite a time gap, the test can be conducted under the same conditions. Accordingly, a state of the to-be-tested surface A can be objectively grasped.

Figure 11:
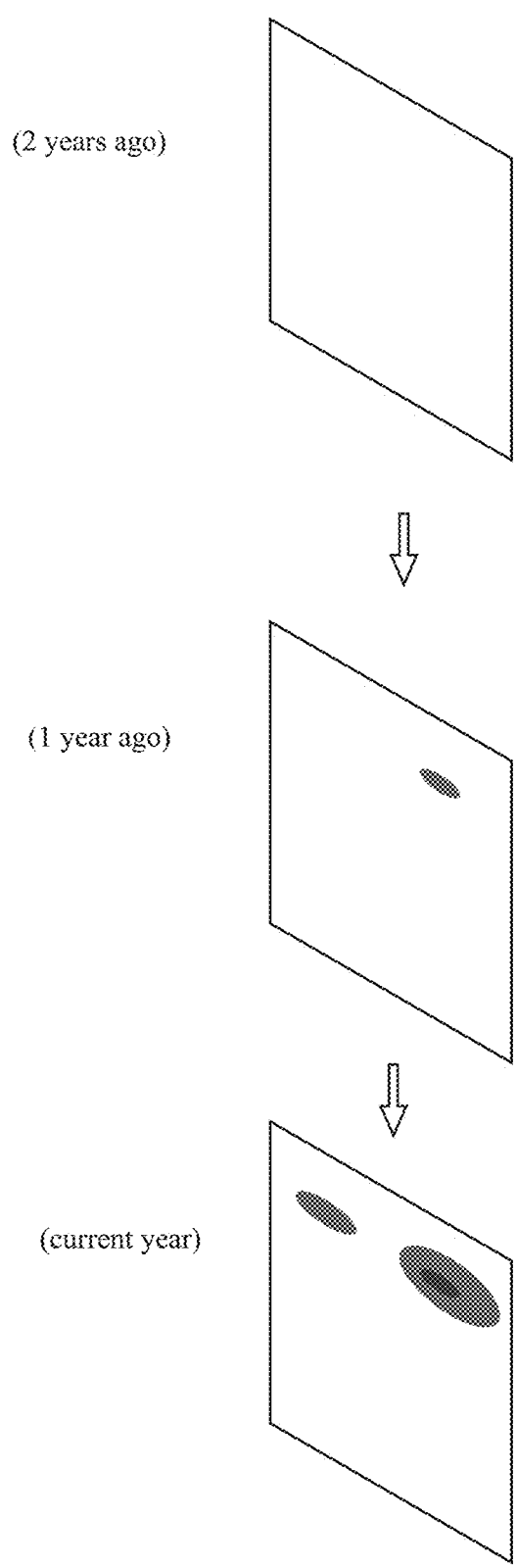
FIG. 11 illustrates an example of a hammering test result.

FIG. 11 illustrates another example of data to be displayed on the display unit 62 after post-processing. In FIG. 11, data of the same to-be-tested surface A acquired in different test years are displayed in parallel. Hammering test results 2 years ago, 1 year ago, and a current year are displayed in order from an upper side. In this way, by comparing the states of the to-be-tested surface A at different hammering test times, deterioration due to aging can be visualized. It is also preferable that the states are displayed in order at predetermined time intervals like animation.

The hammering test device 4 adsorbs to the to-be-tested surface A by decreasing the pressure at a bottom surface side of the housing 4a by the suction fan 42a of the adsorbing mechanism 42. By increasing the airtightness of the space that is defined by the skirt 42b and is to be decompressed, an adsorption force is increased. The skirt 42b extends to be longer than a distance from the bottom surface of the housing 4a to a virtual to-be-tested surface that is a horizontal surface, and even when the to-be-tested surface A is curved, the adsorption force of the adsorbing mechanism 42 is maintained, and the hammering test device 4 travels without falling off the to-be-tested surface A. Therefore, even when a test object is a column or a tunnel, the hammering test system 1 can be applied.

Figure 12A:
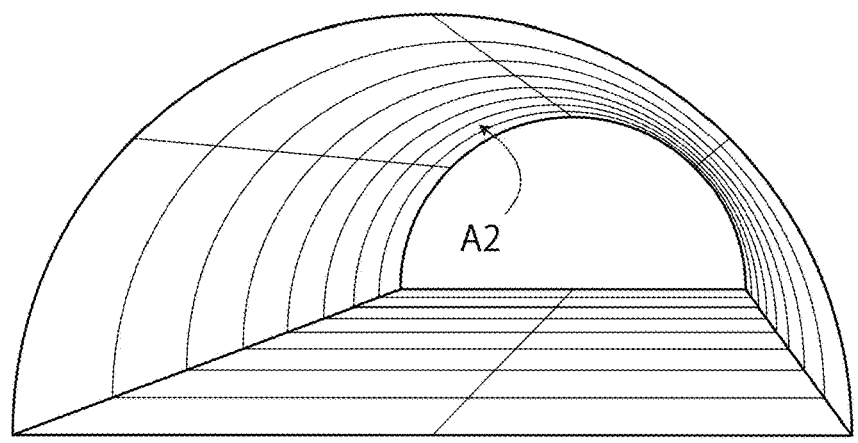
FIGS. 12A, 12B, and 12C illustrate another embodiment according to a hammering test system.
Figure 12B:
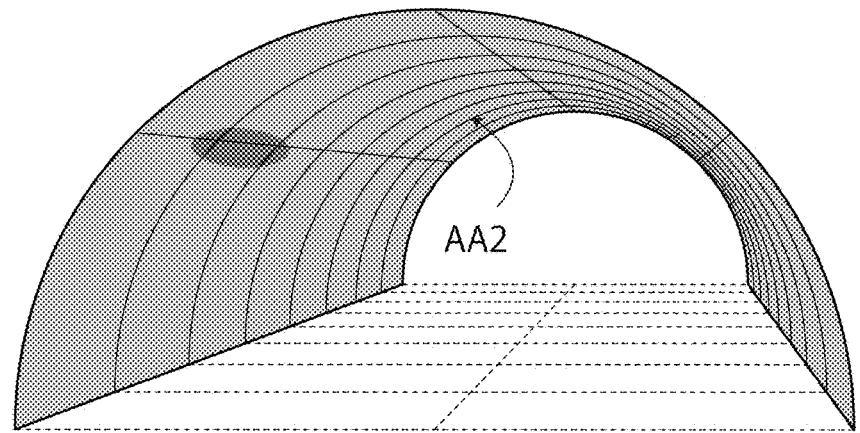
Figure 12C:
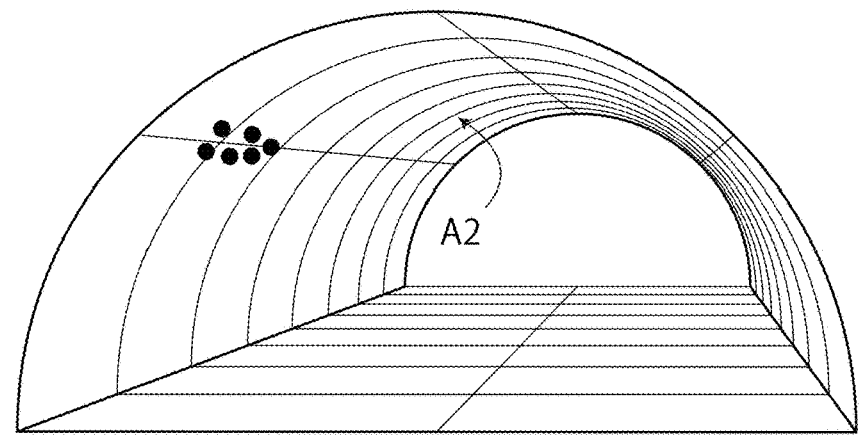

FIGS. 12A, 12B, and 12C illustrate an embodiment of the hammering test system 1 in a tunnel. FIG. 12A illustrates a tunnel as a hammering test object. A curved surface formed to protrude upward above a road is a to-be-tested surface A2. The surveying instrument 2 is disposed inside the tunnel, the hammering test device 4 is disposed at a lower side of the to-be-tested surface A2 at an entrance of the tunnel, and the surveying instrument 2 is caused to track the target T. By repeating a hammering test while the device is caused to autonomously travel on the to-be-tested surface A2 that is a curved surface, the to-be-tested surface A2 can be thoroughly tested.

FIG. 12B illustrates a three-dimensional shape of a to-be-tested surface AA2 obtained by post-processing after hammering tests, and hammering test results, displayed on the display unit 62. A calculated to-be-tested surface A2 is displayed and colored in gray. A portion determined to be abnormal is indicated in darker gray.

FIG. 12C illustrates a tunnel after the tests. Test points P determined to be abnormal by hammering tests are provided with markings.

As illustrated in FIGS. 12B and 12C, even when a test object is a tunnel, the hammering test system 1 can be applied, and both from data and a site, an abnormal portion is visualized, and the abnormal portion is recognizably indicated to an inspector. The hammering test is automatically conducted thoroughly by traveling of the hammering test device 4. Therefore, the test is conducted without any problem even inside a tunnel that is a dark place. A worker re-tests portions with markings in detail and repairs them. In addition, the re-test after the repair can also be easily conducted. In this way, the total number of work processes can be significantly reduced. The tunnel shape and three-dimensional coordinates of an abnormal portion are also grasped. Therefore, the portion with a problem can be intensively tested by a test in the following year. Alternatively, the hammering test system 1 can be applied to conduct a hammering test not only at a tunnel but also in a dark place or at night.

Preferred embodiments of the present invention have been described above, and the embodiments described above are just examples of the present invention. For example, it is also possible that the determining unit 491 is installed in the arithmetic processing unit 65 of the processing PC 6, analyses and determinations are made by the processing PC 6 with high arithmetic processing performance, and only information showing whether there is an abnormality is transmitted to the device control unit 49. It is also possible that the arithmetic processing unit 65 of the processing PC 6 controls traveling of the hammering test device 4, and causes the hammering test device 4 to travel while grasping a position and a posture of the hammering test device 4 in real time. In particular, when a shape of the to-be-tested surface A is known in advance, it is preferable that an optimum traveling route and hammering test points P are calculated, and according to these, the hammering test device 4 is operated to travel from the processing PC 6. In this way, the embodiments can be modified based on the knowledge of a person skilled in the art.

Such modification and a combination of embodiments can be made based on the knowledge of a person skilled in the art, and such modified or combined embodiments are also included in the scope of the present invention.

REFERENCE SIGNS LIST

1: Hammering test system
2: Surveying instrument
4: Hammering test device
6: Processing PC (Personal Computer)
21: Horizontal angle detector
22: Vertical angle detector
25: Surveying instrument control unit
26: Distance-measuring unit
27: Tracking unit
28: Communication unit
41: Traveling mechanism
43: Marking mechanism
49: Device control unit
50: Hammering test mechanism
491: Determining unit
652: Post-processing unit
A: To-be-tested surface
A2: To-be-tested surface
AA: To-be-tested surface
AA2: To-be-tested surface
T: Target

The invention claimed is:

1. A hammering test system comprising:
a hammering test device including a target, a traveling mechanism for automatically traveling on a to-be-tested surface, a marking mechanism configured to perform marking on the to-be-tested surface, an adsorbing mechanism for adsorbing to the to-be-tested surface, and a hammering test mechanism configured to conduct a hammering test on the to-be-tested surface;
a device control unit configured to control the traveling mechanism, the marking mechanism, and the hammering test mechanism;
a surveying instrument including a tracking unit configured to automatically track the target, a distance-measuring unit configured to measure a distance to the target, and an angle-measuring unit configured to measure angles of the target;
a surveying instrument control unit configured to control the surveying instrument; and
a determining unit configured to determine whether there is an abnormality on the to-be-tested surface in a hammering test conducted by the hammering test device, wherein
the device control unit causes the hammering test device to conduct a hammering test by causing the hammering test device to travel to a desired position while causing the hammering test device to adsorb to the to-be-tested surface by the adsorbing mechanism, and controls the marking mechanism to perform marking when the determining unit determines that there is an abnormality, and
the surveying instrument control unit causes the surveying instrument to automatically track the target, and controls the surveying instrument to make distance and angle measurements of the target when conducting a hammering test by the hammering test device.

2. The hammering test system according to claim 1, wherein
the device control unit causes the hammering test device to travel over the entire to-be-tested surface by causing the hammering test device to travel in a predetermined pattern, and causes the hammering test mechanism to conduct a hammering test at intervals of a predetermined time or a predetermined distance during traveling.

3. The hammering test system according to claim 1, wherein
based on data acquired by distance and angle measurements by the surveying instrument, by calculating three-dimensional shape data of the to-be-tested surface and linking the three-dimensional shape data to a determination result obtained by the determining unit, processing to convert a test result into visually recognizable information is performed.

4. The hammering test system according to claim 2, wherein
based on data acquired by distance and angle measurements by the surveying instrument, by calculating three-dimensional shape data of the to-be-tested surface and linking the three-dimensional shape data to a determination result obtained by the determining unit, processing to convert a test result into visually recognizable information is performed.

* * * * *